United States Patent Office 3,494,258
Patented Feb. 10, 1970

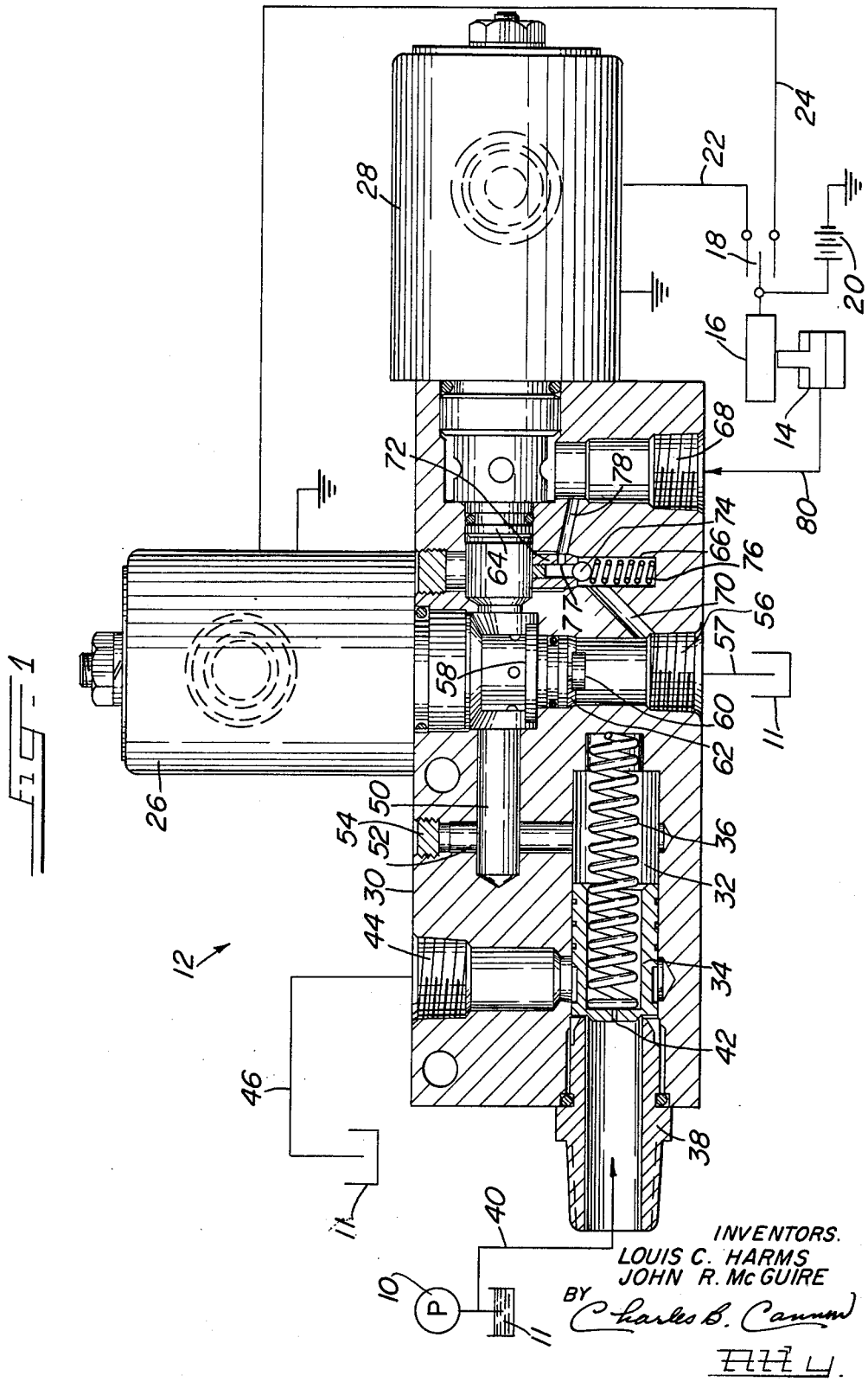

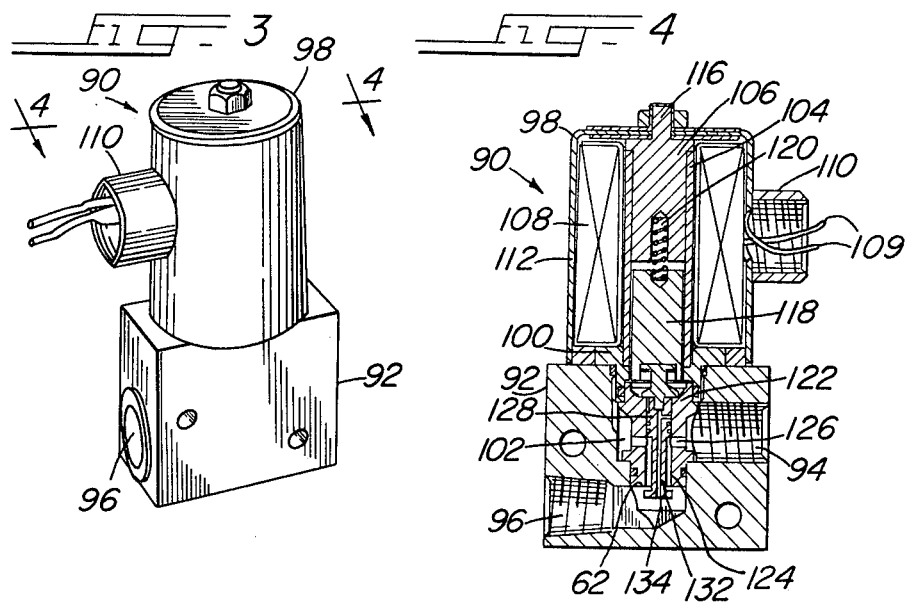
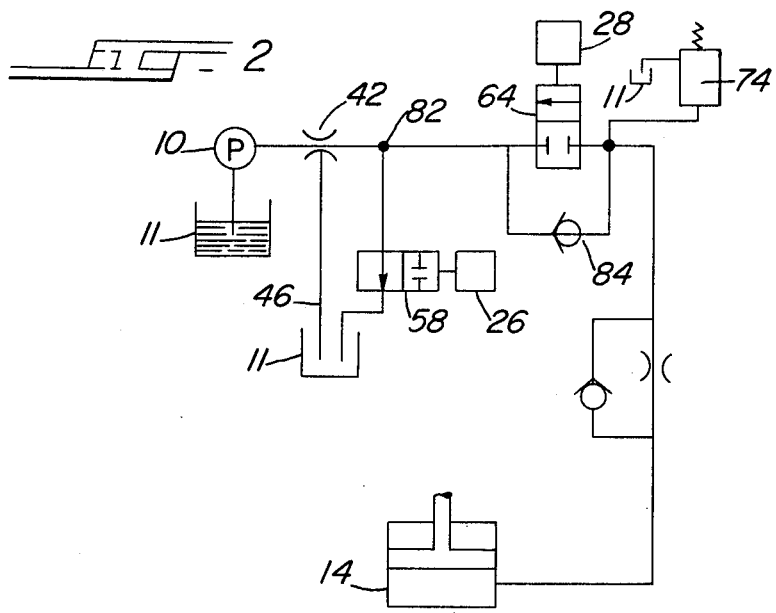

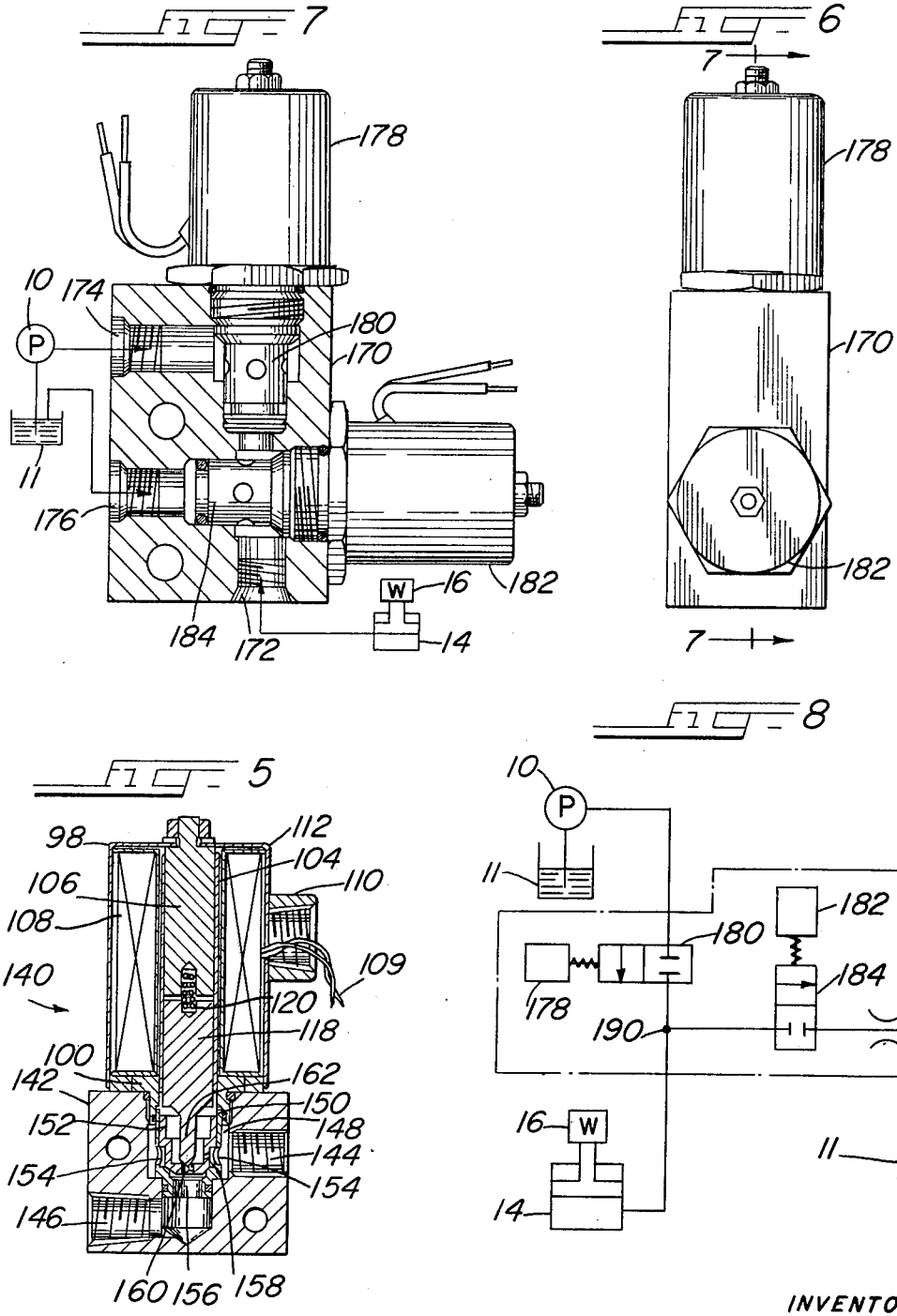

3,494,258
SOLENOID OPERATED VALVE CONTROL MECHANISM
Louis G. Harms, Evanston, and John R. McGuire, Northfield, Ill., assignors, by mesne assignments to Ambac Industries, Incorporated, Garden City, N.Y., a corporation of New York
Continuation of application Ser. No. 539,432, Apr. 1, 1966. This application May 20, 1968, Ser. No. 731,686
Int. Cl. F15b 13/16, 11/08, 13/044
U.S. Cl. 91—390                                                                                        4 Claims

ABSTRACT OF THE DISCLOSURE

Hydraulic control systems including independently controllable on-off valves for interconnecting a pump, a reservoir and a hydraulic actuating assembly, the valves being arranged such that by selective control thereof, the pump output may be directed to the actuating assembly and thereafter the actuating assembly may discharge to the reservoir.

---

This application is a continuation of Ser. No. 539,432, filed Apr. 1, 1966, now abandoned.

This invention relates to hydraulic controls and more particularly it concerns novel valve and circuit arrangements for use in connection with hydraulic control systems.

The present invention is particularly useful in connection with the operation of combines and similar farm implements. Such equipment often includes at least one heavy portion, such as a cutter assembly, which must be lifted, usually by hydraulic means, to a certain height above the ground and then maintained at that height during operation. As the combine moves along however, it encounters variations in the ground contour which tend to vary the height of its cutter assembly. In order to compensate for this, variations in the height of the cutter assembly must be ascertained, and then the cutter height must be adjusted in accordance with such variations.

Attempts have been made in the past to provide automatic regulation of implements such as combines, so that the cutter assembly will remain at a given height relative to the ground in spite of ground contours. The equipment necessary to achieve this automatic regulation however has been relatively complex in that it required refined sensing apparatus and elaborate hydraulic valving arrangements. This of course was costly. Moreover, the complicated equipment of the prior art was very susceptible to damage due to the persistent harsh vibrations and shocks encountered in the operation of the implement. There has thus existed for a considerable length of time a need for simplified and improved valving and circuit arrangements for use with hydraulic control systems.

One object of the present invention is to provide novel and simplified hydraulic valving and circuit arrangements suitable for use in control systems.

Another object of the present invention is to provide novel hydraulic arrangements by which combines and similar equipment can be automatically regulated.

A further object is to provide improved hydraulic valving means suitable for use in connection with the automatic regulation and control of combines and similar equipment.

A further object is to provide simplified hydraulic valve means capable of operation at high flows and under high pressures.

A still further object is to provide an inexpensive hydraulic valving arrangement which can be controlled remotely and with simple electrical means.

The present invention makes possible the realization of these and other objects by means of simple, single acting, hydraulic valve means of unique construction and arranged in a novel manner. These valves are actuated by means of solenoids.

According to one aspect of the invention this valve means comprises a housing in which are formed three internal passageways which terminate inside the housing at a common junction. The other ends of these passageways are connected respectively to a pump output, to a reservoir and to the input of a single acting piston and cylinder assembly which is subject to the continuous action of a load, e.g., the combine cutter assembly. Moveable valve elements are provided in two of the passageways to close and open them to fluid flow whereby the pump output may at one time be directed into the piston and cylinder assembly to raise the load and at another time the piston and cylinder assembly may be connected to the reservoir for lowering of the cutter assembly. Simple solenoid arrangements may be provided for operating the valve elements by remote control.

In another aspect, the present invention contemplates the provision of novel valve configuration adapted to be energized by relatively small solenoids for controlling large amounts of fluid flow under high pressures. These valve configurations include housings having insert members and moveable valve members positioned therein. The insert and moveable valve members are configured to define closeable flow passages and pressure surfaces which permit balancing of pressures for ease of control.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

Specific embodiments of the invention have been chosen for purposes of illustration and description, and are shown in the accompanying drawings, forming a part of the specification, wherein:

FIG. 1 is a side elevational view, partially in section of a valve assembly forming one embodiment of the present invention;

FIG. 2 is a hydraulic circuit schematic of the flow paths of the valve assembly of FIG. 1;

FIG. 3 is a perspective view of a valve mechanism similar to that used in the embodiment of FIG. 1;

FIG. 4 is a section view taken along line 4—4 of FIG. 3;

FIG. 5 is a side elevational view of a second valve mechanism similar to that used in the embodiment of FIG. 1;

FIG. 6 is a front elevational view of a valve assembly forming a further embodiment of this invention;

FIG. 7 is a section view taken along line 7—7 of FIG. 6; and

FIG. 8 is a hydraulic circuit schematic of the flow paths of the valve assembly of FIGS. 6 and 7.

In the hydraulic system shown in FIG. 1, a hydraulic pump 10 obtains hydraulic fluid from a common reservoir, shown schematically at 11; and supplies this fluid at high pressure via a valve assembly 12, to operate an actuating cylinder assembly 14. The actuating cylinder assembly in turn lifts a load 16 which may, for example, be the cutter assembly of a combine.

Switch means 18 are affixed to the load 16. As the load moves up or down this switch means makes contact between an electrical power source 20 and first or second electrical signal lines 22 and 24. These electrical signal lines supply current to raising and lowering solenoids 26 and 28 respectively which in turn operate valves in the valve assembly 12 to control the hydraulic positioning of the load 16.

The valve assembly 12 comprises a housing 30 of generally rectangular overall configuration. An intake bore 32 is formed in one end of the housing 30 and extends inwardly about half the length of the housing. This intake bore is provided with a close fitting cup shaped overflow regulator member 34 which is slideable back and forth along the intake bore 32, but which is biased toward the outer end of the bore by means of an overflow regulator spring 36 positioned in the bore 32 beyond the regulator member 34. A valve input fitting 38 is threaded into the open end of the intake bore 32 and provides an abutment for the overflow regulator member to rest up against under the influence of the overflow regulator spring 34. The valve input fitting 38 also provides means for attaching a high pressure intake line 40 leading from the pump 10 to the valve assembly 12.

The overflow regulator member 34 is provided with a central restricted opening or intake orifice 42 which leads to the inner regions of the intake bore 32. Oil flowing into the valve assembly traverses this orifice and undergoes an initial pressure drop in the process, this pressure drop being proportioned to the rate of fluid flow through the orifice. When the pressure drop causes a force differential on opposite sides of the overflow regulator member 34 which is sufficient to overcome the bias effects of the overflow regulator spring 36, the member 34 will move against the spring deeper into the intake bore 32.

An overflow bore 44 extends into the housing 30 and intercepts the intake bore 32 in the region spanned by the overflow regulator member when this member is biased up against the input fitting 38. Thus under static conditions the overflow bore 44 is isolated from the intake bore 32 by the overflow regulator member 34. When, however, the flow through the intake orifice 42 is sufficient to move the regulator member 34 against the spring 36, the overflow bore 44 then becomes uncovered, and fluid can pass directly from the intake line 40 and out through the overflow bore 44. The overflow bore 44 is connected via an overflow line 46 to the common reservoir 11.

It will be appreciated that the arrangement thus far described provides automatic regulation of the flow rate from the pump 10 through the valve assembly 12. This in turn ensures that the actuating cylinder assembly 14 will cause the load 16 to be moved at a substantially constant rate irrespective of fluctuations which may occur in pump output or in load resistance.

The housing 30 is additionally provided with an elongated valve bore 50 extending inwardly from the end opposite the intake bore 32. A crossover bore 52 extends down into the housing 30 from the top and intercepts these two bores near their deepest ends. The crossover bore 52 is covered at the surface of the housing 30 by means of a threaded plug 54.

A reservoir bore 56 extends transversely through the housing 30 and intersects the valve bore 50. The open end of the reservoir bore 56 is connected via a reservoir line 57 to the common reservoir 11.

A normally open valve assembly 58 is interposed in the reservoir bore. The mechanical construction of the valve assembly 58 will be described more fully hereinafter; suffice it to say at present that the valve assembly includes a valve element 60 which is normally displaced downwardly from a seat 62 to allow flow down into the reservoir bore 56 from the valve bore 50, and which is pressed against the valve seat 62 upon energization of the raising solenoid 26 to prevent such flow.

A normally closed valve assembly 64 extends into the open end of the valve bore 50. This valve assembly, in its normally closed condition, permits free flow of fluid through the valve bore 50 in a direction toward its open end from the reservoir bore 56 but prevents flow in this region in the opposite direction. Opening of the normally closed valve assembly 64 permits free flow in both directions. The actual structure of this valve assembly will also be described more fully hereinafter.

A relief valve bore 66 and an outlet bore 68 are both formed in the housing 30 and both cross through the valve bore 50 at locations toward its open end beyond the effective location of the normally closed valve assembly 64. The deeper or low pressure end of the relief valve bore 66 communicates via a bypass bore 70 with the reservoir bore 56. A valve seat insert 72 is provided in the relief valve bore 66 between the valve bore 50 and the bypass bore 70. A ball valve element 74 is forced against the seat insert 72 by means of a relief valve spring 76. The valve seat insert 72 is closed at its upper end, but it has a side opening 77 above the ball element 74. This opening 77 communicates via a passage 78, with the outlet bore 68. Excessive pressures which occur in the outlet bore 68, as when the actuating cylinder assembly 14 is subjected to shock or overload, are relieved by means of this relief valve arrangement.

Operation of the above described arrangement can best be visualized by reference to the hydraulic schematic shown in FIG. 2. As indicated in FIG. 2, the valve assembly 12 includes three main internal passageways which join together at a common junction 82 within the assembly 12. In the arrangement of FIG. 1 this common junction is located at the intersection of the elongated valve bore 50 and the reservoir bore 56, within the normally open valve assembly 58 upwardly from the valve seat 62. The first passageway extends from the common junction 82 to the actuating cylinder assembly 14. In the assembly of FIG. 1, this includes the right end of the valve bore 50, including the normally closed valve assembly 64, the outlet bore 68 and the pressure line 80. The second passageway extends from the common junction 82 to the pump 10. In the assembly of FIG. 1, this includes the left end of the bore 50, the crossover bore 52, the intake bore 32, and the intake line 40. The third passageway extends from the common junction 82 to the reservoir 11. In the assembly of FIG. 1, this includes the reservoir bore 56, including the normally opened valve assembly 58 and the reservoir line 57.

As indicated at 84 in FIG. 2, and as will be described more fully hereinafter, the normally closed valve assembly 64 is constructed to provide a bypass-check valve feature which permits reverse flow, i.e., flow through the first passageway from the junction 82 to the actuating cylinder assembly 14, even when the valve is in its normally closed position as shown. Such reverse flow will occur whenever the pressure on the junction side of the normally closed valve assembly 64 exceeds the pressure on the actuating cylinder assembly side of the valve assembly 64.

As indicated previously the actuating cylinder assembly 14 is of the single action variety so that only a single hydraulic connection, i.e., to the pressure line 80 is used for the assembly. The actuating cylinder assembly 14 is subject to a continuously applied opposing force from the load 16. In the case of a combine the load 16 would be the cutter assembly, and the continuous force supplied by this load would be the result of its weight tending to move it downwardly toward the earth. This downward force, of course, is opposed by the upward forcing action of the actuating cylinder assembly 14, which in turn receives force producing pressure via the hydraulic pressure line 80. In order for the load 16 to move either up or down, such movement must be accompanied by a corresponding flow of fluid in the pressure line 80, and accordingly, through the first passageway. However, so long as the normally closed valve assembly 64 remains in its normal or unactuated condition as indicated in FIG. 2 no fluid can flow through the first passageway from the actuating cylinder assembly 14 so that the load 16 cannot move downwardly against the action of the assembly. At the same time, however, the pump 10 operates continuously to force fluid through the second passageway to the common junction 82; and since the third passageway to the reservoir is open, due to the normally opened valve assembly 58 being in its normal or unactuated condition, fluid from the pump 10 will proceed from the common junction 82 out through the third passageway to the reservoir 11.

In order to raise the load 16 the raising solenoid 26 is energized to close the normally open valve assembly 58. This closes and prevents fluid flow through the third passageway. As a result the pressure at the common junction 82 increases and eventually reaches a magnitude greater than that in the pressure line 80. As a result the bypass-check valve (indicated at 84 in FIG. 2) of the normally closed valve assembly 64 operates to permit reverse flow through the first passageway and out through the pressure line 80 to the actuating cylinder assembly 14. This flow of fluid into the actuating cylinder assembly causes it to extend and raise the load 16. The load 16 will, of course, continue to rise as long as fluid continues to flow into the actuating cylinder assembly 14; and this in turn will continue so long as the raising solenoid 26 is energized to block the third passageway between the common junction 82 and the reservoir 11. When the solenoid 26 is deenergized the third passageway is again opened and fluid flow from the pump 10 will be diverted from the common junction 82 to the reservoir 11. The pressure at the common junction will then decrease to less than the pressure in the line 80 and flow through the first passageway to the actuating cylinder assembly 14 will cease. Thus the load 16 will not be raised beyond its level at the time the raising solenoid 26 becomes deenergized. On the other hand, the load 16 will not descend from its new position for the action of the normally closed valve assembly 64 prevents flow out of the actuating cylinder assembly 14 to the common junction 82.

To lower the load 16, the lowering solenoid 28 is energized to open the normally closed valve assembly 64. As a result of this the third passageway is opened so that fluid can flow from the actuating cylinder assembly 14 through the now opened valve assembly 64 to the common junction 82. This fluid flow will continue from the junction 82 down through the third passageway and the normally opened valve assembly 58 to the reservoir 11. The load 16 will thus continue to descend so long as the normally closed valve assembly 64 is held opened by the action of the lowering solenoid 28.

The system achieves automatic control by causing the position of the load 16 with respect to the ground level, or some other variable, to be monitored as by the switch means 18. When the load 16 becomes low with respect to the ground the switch means 18 is thrown to energize the raising solenoid which operates as above decsribed to control the valve assembly 12 so that the load is raised. The load will raise until it allows the switch 18 to return to its normal position disconnecting both solenoids 26 and 28. The load 16 will then remain stationary. Should its relative position wtih respect to ground level become too high the switch means 18 will be thrown in the opposite direction so that the lowering solenoid 28 becomes energized and a reverse, or lowering action takes place as above described.

FIGS. 3 and 4 show in perspective and section a valve and solenoid asembly 90 of the same general type as the raising solenoid 26 and its associated normally open valve assembly 58. The assembly 90 is shown as adapted for general use; and thus contains its own housing 92, having an inlet passage 94 and an outlet passage 96. The housing 92, of course, is replaced by the housing 30 in the embodiment of FIG. 1, with the elongated valve bore 50 serving as the inlet passage 94, and the reservoir bore 56 serving as the outlet passage 96. In all other respects the valve and solenoid assembly 90 of FIGS. 3 and 4 is the same as the raising solenoid 26 and the normally open valve assembly 58 of the embodiment of FIG. 1.

The valve and solenoid assembly 90 includes a solenoid 98 mounted on the housing 92. The solenoid 98 is made up of a base member 100 which fits part way into an opening 102 formed in the housing 92. A sleeve member 104 is attached to and extends upwardly from the base member 100 and has secured to it a stationary core 106. An electrical coil 108 is wound around the sleeve member 104 and connecting wires 109, which supply energizing power to the coil 108, extend out from the coil through a grommet 110. The grommet 110 is mounted on the side of a cylindrical cover 112 which fits down over the coil 108. The cover 112 is secured in placed by means of a nut 114 which is threaded onto a protrusion 116 at the top of the stationary core 106.

A moveable core 118 is located within the sleeve member 104 just below the stationary core 106; and is moveable up and down within the sleeve 104. A bias spring 120 is positioned between the two cores and urges the moveable core 118 downwardly. When the coil 108 becomes energized, as by causing electrical current to flow through the windings, the magnetic forces thus produced act to urge the moveable core 118 upwardly against the bias spring force.

A tubular insert 122 extends down through the opening 102 just below the base member 100 of the housing 92. The insert 122 is provided with an axial passage 124 which extends completely through the insert, and a transverse passage 126 which crosses through and intercepts the axial passage at a point approximately midway of the length of the insert 122. The inlet passage 94 communicates with the transverse passage 126 while the outlet passage 96 communicates with the lower end of the axial passage 124.

A valve element 128, similar to the valve element 60 of the embodiment of FIG. 1 extends up through the axial passage 124 and connects by means of a connector member 130 to the lower end of the moveable core 118 so that the valve element 128 moves up and down within the axial passage 124 with movements of the moveable core 118. The valve element 148 is essentially cylindrical in configuration and fits closely within the axial passage 124. It is provided with an outer recess 132 however which extends along a portion of its length. As shown in FIG. 4, this recess provides communication between the inlet and outlet passages 94 and 96 via the axial passage 124 when the valve element 128 is in its lowermost position. When the coil 108 becomes energized to raise the moveable core 118 and the valve element 128 however, the lower portion of the valve element closes off the lower end of the axial passage 124 to prevent fluid communication between the inlet and outlet passages 94 and 96. An axial bore 134 extends up through the center of the valve element 128 to provide fluid communication in the region of the moveable core 118 so that the moving parts of the valve assembly are adequately lubricated.

It will be appreciated that the above described valve assembly permits fluid communication between its inlet and outlet passages 94 and 96 in both directions when the coil 108 is left deenergized. However, upon energization of the coil the valve closes and prevents fluid communication in either direction between the two passageways.

FIG. 5 shows the configuration of a valve and solenoid assembly 140 of the same general type as the lowering solenoid 28 and its associated normally closed valve assembly 64 in the embodiment of FIG. 1. The assembly 140 however, is shown with a self-contained housing 142 which replaces the housing 30 of the embodiment of FIG.

1. The housing 142 includes an inlet passage 144 and an outlet passage 146. An opening 148 is formed down through the center of the housing 142 between the inlet and outlet passages 144 and 146. The assembly 140 includes a solenoid 98 which may be identical to the solenoid of the embodiment of FIG. 4. The solenoid 98 may thus include a base member 100, a sleeve member 104, stationary and moveable cores 106 and 118, a bias spring 120, a coil 108 and a cover 112.

A stationary insert member 150 is located within the opening 148 and serves to guide a moveable insert member 152 for limited up and down movements therewithin. The moveable insert member 152 is of generally cup-shaped configuration and in its lowermost position, as shown in FIG. 5, it serves to prevent axial flow down through the inside of the stationary insert member 150. The fluid from the inlet passage 144 proceeds into the inside of the stationary insert member 150 via transverse openings 154 formed therein. When the moveable insert member 152 is raised this fluid can continue to flow down through a lower axial opening 156 and down into the outlet passage 146.

The moveable insert member 152 is provided with a first restrictive orifice 158 which communicates with the interior of the stationary insert member 150 and through its transverse openings 154 to the inlet passage 144. There is also provided a control orifice 160 of somewhat larger diameter than the restrictive orifice 158 and which is located at the bottom of the moveable insert member 152 for communication with the lower axial opening 156 and the outlet passage 146. The control orifice 160 is normally blocked or plugged by means of a control plug 162 which is attached to the bottom end of the moveable core 118.

When the solenoid 98 is deenergized, the bias spring 120 forces the moveable core 118 and the control plug 162 downwardly so that the control plug blocks the control orifice 160. As a result the pressure within the moveable insert 152 becomes equal to the pressure at the inlet passage 144 while the pressure on the lower side of the bottom of the moveable insert 152 remains at the pressure of the outlet passage 146. Thus the moveable insert 152 is forced downwardly to maintain the lower axial opening 156 blocked from fluid flow.

When the solenoid 98 is energized, however, the moveable core 118 and control plug 162 raise to unblock the control orifice 160. This allows fluid flow out from the inside of the moveable insert member 152 and out through the outlet passage 146. As a result of this movement of fluid a greater pressure drop is experienced across the restrictive orifice 158 then the control orifice 160. Accordingly, the pressure inside the moveable insert 152 decreases and the insert can then rise to permit free flow of fluid from the inlet passage 144 to the outlet passage 146.

It will be noted that when the valve arrangement of FIG. 5 is in its normally closed position, fluid can flow in a reversed direction, i.e., from the outlet passage 146 to the inlet passage 144, should the outlet passage pressure rise to a magnitude greater than that at the inlet passage 144. When this occurs the moveable insert 152 will be moved upwardly thus opening the lower axial opening 156 and permitting fluid flow out through the inlet passage 144.

The arrangement of FIGS. 6 and 7 provides control of fluid flow between a pump 10 and an actuator cylinder assembly 14 to control the position of a load 16. The fluid circuit arrangement of the embodiment of FIG. 7, however, is somewhat different from that of the embodiment of FIG. 1. According to the embodiment of FIG. 7 there is provided a housing 170 formed with a longitudinal passageway 172 and first and second transverse passageways 174 and 176 which intercept the longitudinal passageway 172. A raising solenoid 178 is mounted on the housing 170 and controls a normally closed valve assembly 180 which is positioned in the longitudinal passageway 172 near its intersection with the first transverse passageway 174. There is additionally provided on the housing 170, a lowering solenoid 182 which controls the actuation of a normally closed valve assembly 184 which is located in the second or lower transverse passageway 176. The output from the pump 10 is connected into the first or upper transverse passageway 174 while the output of the second or the lower transverse passageway 176 is connected to a fluid reservoir 11. The open end of the longitudinal passageway 172 is connected by a pressure line to the actuator cylinder assembly 14.

As shown in FIG. 8 the hydraulic circuit arrangement within the valve assembly of FIG. 7 includes first, second and third internal passageways which join at a common junction 190. The first passageway extends from the common junction 190 through the lower end of the longitudinal passageway 172 to the actuator cylinder assembly 14. The second passageway extends from the common junction 190 through the normally closed valve assembly 180 and the first or upper transverse passageway 174 to the pump 10. The third passageway extends from the common junction 190 through the second normally closed valve assembly 184 and the lower transverse passageway 176 to the reservoir 11.

With both solenoids 178 and 182 deenergized and their respective normally closed valve assemblies 180 and 184 in their normally closed positions as indicated in FIG. 8 no fluid can flow through the first passageway to the actuating cylinder assembly 14. Thus, the load element 16 will remain stationary during this time.

When the raising solenoid 178 is energized however, the second passageway is opened so that communication is established between the output of the pump 10 and the actuating cylinder assembly 14. This permits the actuating cylinder assembly to raise the load 16 during this time. The load will continue to move until the raising solenoid 178 is deenergized and returns to its normally closed position, whereupon the load will remain fixed at its last position.

When the lowering solenoid 182 becomes energized, fluid communication is established via the third passageway between the actuating cylinder assembly 14 and the reservoir 11. Accordingly, fluid may flow out from the actuating cylinder assembly so that the load 16 will be lowered. Such lowering will continue until the lowering solenoid 182 is deenergized and its normally closed valve assembly 184 is returned to its normal position.

It will be appreciated that the valves and circuits described above permit close and accurate hydraulic control without requiring elaborate valve arrangements. The valve and circuit arrangements of the present invention are simple in structure and yet are capable of handling large flows in pressure differentials in a reliable and efficient manner.

What is claimed as new and desired to be secured by Letters Patent is:

1. An hydraulic control system comprising an hydraulic pump, an hydraulic reservoir, an hydraulic actuating assembly constructed and arranged to be subject to the continuous action of a load to be controlled, means defining a first hydraulic passageway between a junction and said actuating assembly, means defining a second hydraulic passageway between said junction and said pump, means defining a third hydraulic passageway between said junction and said reservoir, a first normally open valve mechanism arranged in said third passageway and selectably operable to closed condition, a second valve mechanism provided with resilient biasing means normally biasing it to a closed condition, said second valve mechanism being arranged in said first passageway for normally preventing fluid flow through said first passageway in a first direction from said actuating assembly to said junction but being responsive to fluid pressure in said first passageway for permitting fluid flow in the opposite direction, and independent means for opening said second valve mechanism to permit fluid flow in said first direction, whereby actuation of said first valve mechanism to closed condition places said pump in fluid communication with said actuating assembly and isolates the latter from said reservoir, while actuation of said second valve mechanism to open condition establishes fluid communication between said actuator assembly and said reservoir, and means for separately and independently causing said actuation of each of said valve mechanisms.

2. An hydraulic control system according to claim 1, wherein said means for causing actuation of said valve mechanisms comprise individual solenoids operatively coupled to said respective valve mechanisms for causing said actuation thereof when energized, switch means in circuit with said solenoids, and means operative to actuate said switch means in accordance with the position of said load.

3. An hydraulic control system according to claim 1, wherein said means for causing actuation of said valve mechanisms comprise individual solenoids operatively coupled to said respective valve mechanisms for causing said actuation thereof when energized.

4. A valve assembly comprising a housing having formed therein first, second and third internal passageways which terminate within the housing at a common junction, said first passageway being connectable to a single acting hydraulic piston and cylinder assembly, and said second and third passageways being connectable, respectively, to an hydraulic pressure source and to a reservoir, a first valve mechanism with a movable valve element arranged in said first passageway, biasing means, said biasing means being coupled to said movable element for normally biasing the latter in a valve closed position, said valve mechanism being oriented to prevent flow through said first passageway towards said junction when said movable element is in said closed position, said movable element being pressure openable from its biased closed position to permit flow through said first passageway away from said junction, separate means for selectably actuating said movable element to a valve open position, a second valve mechanism with a movable element arranged in said third passageway, means for biasing said movable element of said second valve mechanism to a passageway opening condition, and independent means for selectably actuating said last mentioned movable element to a passageway closing condition.

References Cited

UNITED STATES PATENTS

| | | | |
|---|---|---|---|
| 2,477,710 | 8/1949 | Worstell | 91—452 |
| 2,731,952 | 1/1956 | Szaba | 91—459 |
| 2,900,960 | 8/1959 | Gratzmuller | 91—459 |
| 3,030,930 | 4/1962 | Gratzmuller | 91—454 |
| 3,282,283 | 11/1966 | Takeda | 91—390 |
| 3,363,514 | 1/1968 | Rameke | 91—449 |

PAUL E. MASLOUSKY, Primary Examiner

U.S. Cl. X.R.

91—451, 454, 459